United States Patent
Latsha

[11] 3,795,050
[45] Mar. 5, 1974

[54] TRIMMER CATCH BOX
[76] Inventor: Albert L. Latsha, 460 Colfax Rd., Havertown, Pa. 19083
[22] Filed: Oct. 11, 1972
[21] Appl. No.: 296,522

[52] U.S. Cl. ................................................ 30/132
[51] Int. Cl. ........................................... B26b 19/48
[58] Field of Search..30/124, 131, 132, 133; 56/144, 56/194

[56] References Cited
UNITED STATES PATENTS
3,552,013   1/1971   Stone ................................... 30/132

FOREIGN PATENTS OR APPLICATIONS
9,810   4/1912   Great Britain ........................ 30/132
26,133   11/1910   Great Britain ........................ 30/131
633,205   11/1949   Great Britain ........................ 30/131

Primary Examiner—Othell M. Simpson
Assistant Examiner—J. C. Peters

[57] ABSTRACT

This application discloses a trimmer catch box which can be readily attached to a power driven hedge trimmer of either a single edge or double edge type instantly without attaching tools; which provides guide tines or fingers disposed at an angle to the cutter plane for efficient cutting; and which provides a catch box bottom disposed at an angle to the cutter plane for effective reception and retention of clippings and guidance of the trimmer when the cutting plane is vertical, horizontal, or inclined.

10 Claims, 5 Drawing Figures

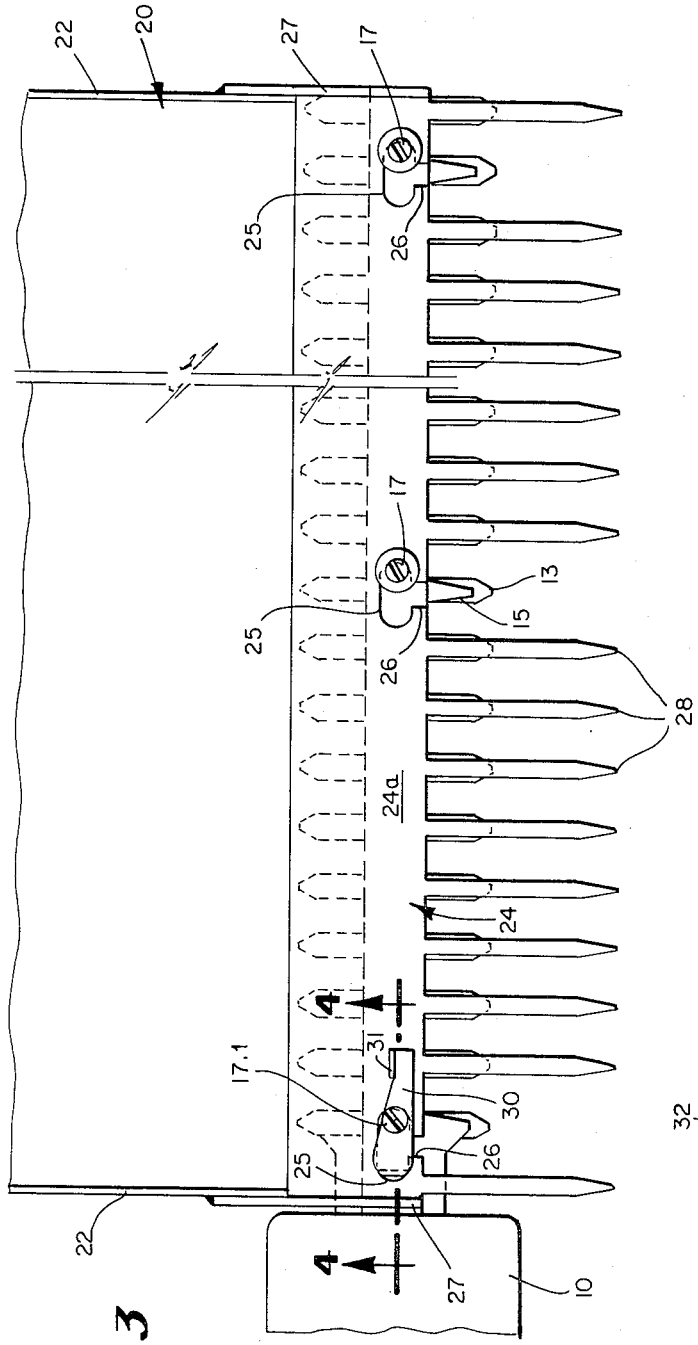
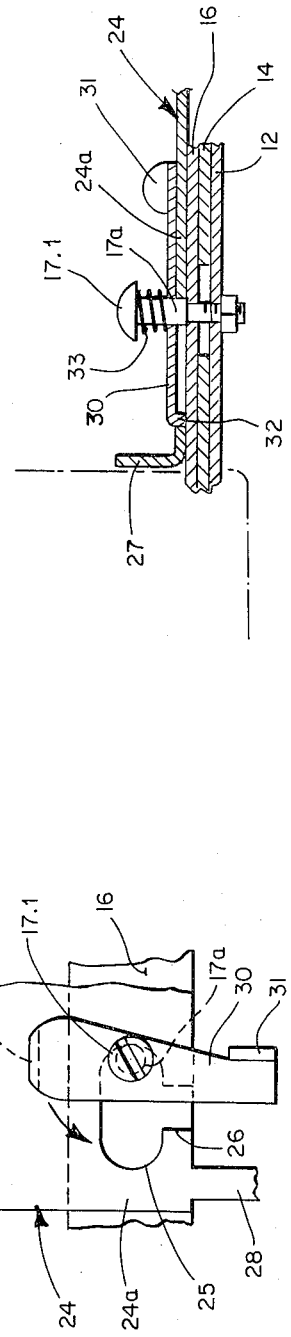
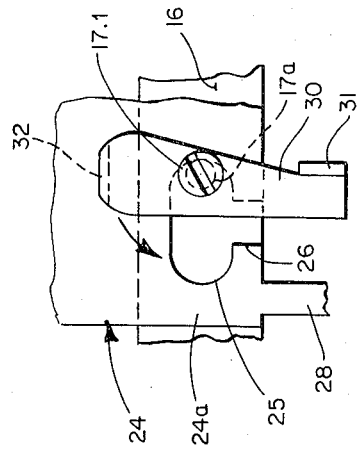

TRIMMER CATCH BOX

BACKGROUND OF THE INVENTION

Heretofore catch boxes have been provided for power operated hedge clippers but, so far as known, they have not provided guide tines for directing clippings to the cutter blade and into the catch box; have not provided quick and convenient attaching means; have not provided reversible attaching means so as to be used on either side of double edge cutters; and have not provided effective angular relationship of tines and box to the cutter plane.

SUMMERY OF THE INVENTION

The present invention provides a trimmer catch box attachment which carries means for ready mounting on a power trimmer; which is reversible for attachment in opposite positions to a double edge trimmer; which has tines or fingers for guiding stems to the cutter and directing cut material into ehe catch box; which has tines and catch box bottom disposed at effective angles to the cutter plane; and which is comprised of a simple and easily manufactured assembly.

DRAWINGS

The invention will be described in connection with a specific exemplary embodiment shown in the accompanying drawings, wherein:

FIG. 3 is an enlarged top plan view of the cutter bar with the catch box attached in one position for cutting at one edge;

FIG. 4 is a further enlarged longitudinal vertical section taken on the line 4—4 of FIG. 3;

FIG. 5 is an enlarged partial plan view, as in FIG. 3, but showing parts in unlatched position.

SPECIFIC EMBODIMENT

Figure 1:
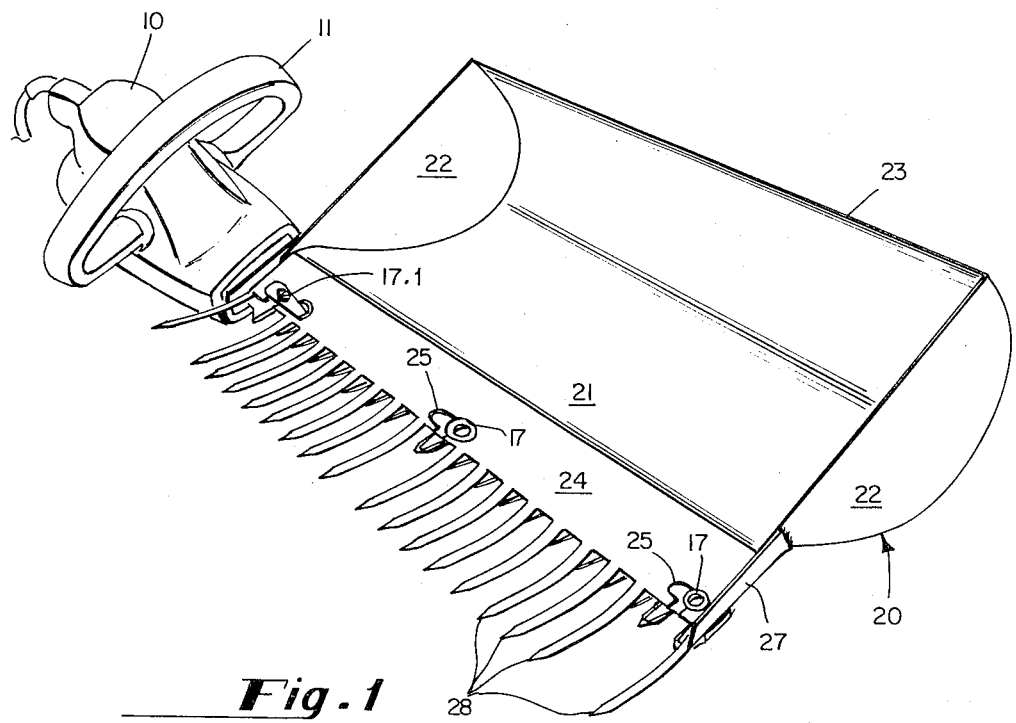
FIG. 1 is a top perspective view of the catch box of the present invention secured in operating position to a double edge power hedge clipper.
Figure 2:
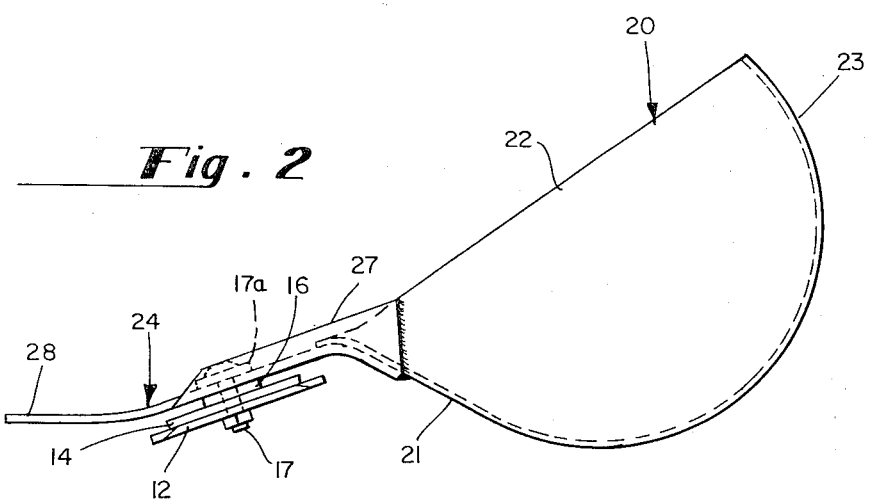
FIG. 2 is an outer end view of the same assembly as shown in FIG. 1 with the operating motor casing and carrying handle omitted.

The embodiment illustrated herein comprises a market-available hedge trimmer having a drive motor casing assembly 10 with handle 11, a double edge cutter backing bar 12 with fixed cutter teeth 13 on either edge, a double edge cutter blade 14 reciprocated by the motor and having double-edged cutting teeth 15 on either side, and a retaining bar 16 secured to the backing bar 12 by a plurality of stud bolts 17. The body of the blade 14 is slotted to accommodate reciprocatory movement for cutting. The trimmer as sold provides for the securement of attachments, as a saw or the like, and the stud bolts 17 have enlarged extensions 17a above the retaining bar 16. The outer two stud bolts 17 may be assumed to be standard on the trimmer illustrated or to be replacements for the present catch box. However, the inner stud bolt 17.1 is specially provided by the present invention, as will be described, for ready securement of the catch box on the trimmer.

According to the present invention, the catch box attachment comprises a catch box proper, generally designated by the numeral 20, having a bottom 21 and ends 22. The bottom is flat in front and curved at the rear to provide a high rear wall 23 and is preferably roughened, as by striking up in places, for rigidity and better retention of trimmings. For lightness the box proper may be formed of aluminum sheet, indented aluminum sheet material being available on the market. The parts may be secured together in any suitable manner, as by rivets, soldering, adhesive, or the like.

A heavier attaching sheet 24, as of stainless steel, is secured to the front edge of the bottom of the box proper, as by rivets, soldering, adhesive, or the like, the attaching sheet having a flat portion 24a adapted to overlie the retaining bar 16, this flat portion having elongated slots 25 with intermediate enlargements, such as front openings 26, adapted to be slipped on the enlarged portions 17a of the stud bolts 17, 17.1 and beneath the heads and washers of the stud bolts to retain the catch box on the cutter bar. The opposite ends of the flat portion 24 are turned up, as at 27, for securement to the box proper, for strength and rigidity, and to guide trimmings into the catch box.

Tines or fingers 28 extend forward from the front edge of the flat plate portion 24 to guide and force stems to be cut to the cutter blade. These tines are quite long and preferably made integral with the plate portion 24a. They are located directly above the backing bar teeth 13 to allow free entry of stems into cutting position. Tines may be omitted at stud bolt locations if they would interfere with engagement entry of the studs with the catch box assembly. The tines are angled upward from the cutter plane to allow free entry of the cutter blade to the stems. As here shown, the angle is about 20°.

The front edge of the bottom 21 of the catch box is angled downward slightly from the plane of the cutter so as to retain the clippings and assist in guiding the device along the cut surface of the hedge. The bottom of the catch box and the tines are disposed approximately in a common plane. As here shown, the angle of the catch box bottom relative to the cutting plane is about 10 degrees.

Means are provided for locking the catch box assembly in place on the cutter. As here shown, the locking means comprises a latch lever 30 turnably mounted on the long stud bolt 17.1, the latch lever having an upstanding finger element 31 at one end and a downturned, preferably arcuate, element 32 at the other end adapted to enter a slot and engage one end thereof for locking. The lever can be lifted for disengagement against a spring 33 which normally holds it down securely in locking position.

The catch box is instantly attachable and removable without tools of any kind and is reversible for use on either side of a double edge trimmer. For attachment, the assembly is pushed forward to engage the stud bolts of the clipper in the slots of the attachment assembly, then moved endwise to the ends of the slots. The catch or latch lever 30 is turned to engage its end element 32 against the end of the slot. The spring 33 holds the latch lever securely in place. For removal, the latch lever is lifted and turned to its off position, as shown in FIG. 5, and the attachment moved endwise and rearwardly to disengage it from the retaining stud bolts.

When assembled, the attachment makes a runner-like guide for trimming and holds the accumulated cuttings securely in place without tendency to slide forward into the cutter blade. The angular relation of tines to the cutting plane makes for less over-ride and faster smoother action.

While one embodiment of the invention has been illustrated and described by way of example, it is to be understood that there may be various embodiments and modifications within the general scope of the invention.

I claim:

1. A catch box attachment for a trimmer having a cutter backing bar with spaced teeth, a cutting blade with spaced teeth, the cutting blade being reciprocable along the backing bar to move the teeth past each other, a retaining bar, and spaced stud bolts with heads projecting above the retaining bar, in combination therewith: a catch box having a bottom provided with slots for engaging beneath the heads of the stud bolts and movable endwise to the ends of the slots, and latch means mounted on one of the stud bolts and having a retaining element engageable in the slot embracing the stud therein for holding the box with its slots in end position on the stud bolts.

2. A catch box attachment as set forth in claim 1, which further includes in combination, forwardly projecting tines disposed above and in front of the spaced teeth of the cutter and backing bars for guiding stems to the cutter and assisting in forcing cut material back into the box.

3. A catch box attachment as set forth in claim 2, wherein said tines are inclined upwardly at an angle toward their front ends from the front portion of the bottom of the catch box.

4. A catch box attachment as set forth in claim 3, wherein the angle of inclination of said tines to the front portion of the bottom of the box is about 20 degrees.

5. A catch box attachment as set forth in claim 3, further characterized by the fact that the bottom of the rear portion of the catch box behind the backing bar and cutting blade is inclined downwardly at an angle.

6. A catch box attachment as set forth in claim 5, wherein the angle of inclination of the rear portion of said box bottom to the front portion is about 10 degrees.

7. A catch box attachment as set forth in claim 1, wherein said latch means comprises a latch lever turnably and slidably mounted on a stud bolt and having a downturned end element engageable with an end of the slot when the lever is in a lowered position on the stud bolt.

8. A catch box attachment as set forth in claim 7, which further includes means on the stud for urging said latch lever down into lowered position to engage its element in the slot.

9. A catch box attachment as set forth in claim 1, wherein said slots have a medial opening to receive said stud bolts and extend in opposite directions from said medial opening for movement to either side of the medial opening for mounting in reversible positions on a double edge trimmer.

10. A catch box attachment for a trimmer having a cutter backing bar with spaced teeth, a cutting blade with spaced teeth, and a retaining bar, in combination: a catch box having a rear box portion, a front attaching portion, and forwardly projecting tines disposed above and extending in front of the spaced teeth of the cutter and backing bars for guiding stems to the cutting teeth and assisting in forcing cut material rearwardly into the box.

* * * * *